United States Patent
Cheng et al.

(10) Patent No.: US 10,586,993 B2
(45) Date of Patent: Mar. 10, 2020

(54) DEHYDROGENATION REACTION SYSTEM FOR LIQUID HYDROGEN SOURCE MATERIAL

(71) Applicant: WUHAN HYNERTECH CO., LTD., Wuhan, Hubei (CN)

(72) Inventors: Hansong Cheng, Hubei (CN); Yanlong Sun, Hubei (CN); Yilong Guan, Hubei (CN)

(73) Assignee: WUHAN HYNERTECH CO., LTD., Wuhan, Hubei (CN)

( * ) Notice: Subject to any disclaimer, the term of this patent is extended or adjusted under 35 U.S.C. 154(b) by 309 days.

(21) Appl. No.: 15/557,746

(22) PCT Filed: Apr. 8, 2016

(86) PCT No.: PCT/CN2016/078759
§ 371 (c)(1),
(2) Date: Sep. 12, 2017

(87) PCT Pub. No.: WO2016/161955
PCT Pub. Date: Oct. 13, 2016

(65) Prior Publication Data
US 2018/0069255 A1 Mar. 8, 2018

(30) Foreign Application Priority Data

Apr. 10, 2015 (CN) .......................... 2015 1 0167881
Apr. 10, 2015 (CN) .......................... 2015 1 0167935
(Continued)

(51) Int. Cl.
*H01M 8/22* (2006.01)
*H01M 8/0612* (2016.01)
(Continued)

(52) U.S. Cl.
CPC ......... *H01M 8/0618* (2013.01); *C01B 3/0015* (2013.01); *C01B 3/22* (2013.01);
(Continued)

(58) Field of Classification Search
CPC .. H01M 8/0612; H01M 8/22; H01M 2250/20; H01M 8/0618; C01B 3/26;
(Continued)

(56) References Cited

U.S. PATENT DOCUMENTS

2005/0002857 A1* 1/2005 Pez .................. C01B 3/0015
423/648.1
2005/0224042 A1* 10/2005 Shinagawa ............. F02B 43/10
123/295
(Continued)

FOREIGN PATENT DOCUMENTS

CN 203690410 U 7/2014
CN 104971675 A 10/2015
(Continued)

OTHER PUBLICATIONS

JP 2005216774MT3 (Year: 2005).*
JP2011251858 (Year: 2011).*

*Primary Examiner* — Alexander Usyatinsky
(74) *Attorney, Agent, or Firm* — Novick, Kim & Lee, PLLC; Allen Xue

(57) ABSTRACT

A dehydrogenation reaction system for a liquid hydrogen source material includes a storage device used for storing a liquid hydrogen source material and a liquid hydrogen storage carrier, a reaction still for dehydrogenation of the liquid hydrogen source material, a gas-liquid separator for separating the products, hydrogen and liquid hydrogen storage carrier which are generated after dehydrogenation of the liquid hydrogen source material, a buffer tank used for storing hydrogen, and a heating device used for heating the reaction still. The liquid hydrogen source material is input
(Continued)

into the reaction still by means of a pump through an input pipe, dehydrogenation reaction of the liquid hydrogen source material is conducted in the reaction still, generated hydrogen is conveyed to the buffer tank, and the liquid hydrogen storage carrier generated after dehydrogenation is conveyed back to the storage device.

16 Claims, 8 Drawing Sheets

(30) Foreign Application Priority Data

| Apr. 10, 2015 | (CN) | 2015 1 0167958 |
|---|---|---|
| Apr. 10, 2015 | (CN) | 2015 1 0167977 |
| Apr. 10, 2015 | (CN) | 2015 1 0167978 |
| Jun. 11, 2015 | (CN) | 2015 1 0318905 |
| Dec. 14, 2015 | (CN) | 2015 1 0919949 |
| Dec. 14, 2015 | (CN) | 2015 1 0922921 |
| Jan. 28, 2016 | (CN) | 2016 1 0059961 |

(51) Int. Cl.
  *C01B 3/22* (2006.01)
  *C01B 3/00* (2006.01)
  *C01B 3/26* (2006.01)
  *B60L 58/30* (2019.01)

(52) U.S. Cl.
  CPC ............... *C01B 3/26* (2013.01); *H01M 8/22* (2013.01); *B60L 58/30* (2019.02); *C01B 2203/0277* (2013.01); *C01B 2203/066* (2013.01); *C01B 2203/067* (2013.01); *C01B 2203/1235* (2013.01); *C01B 2203/1252* (2013.01); *H01M 2250/20* (2013.01); *Y02E 60/328* (2013.01); *Y02P 20/129* (2015.11); *Y02T 90/32* (2013.01)

(58) Field of Classification Search
  CPC . C01B 3/0015; C01B 3/22; C01B 2203/1235; C01B 2203/066; C01B 2203/0277; C01B 2203/1252; C01B 2203/067; B60L 58/30; Y02E 60/328; Y02T 90/32; Y02P 20/129
  See application file for complete search history.

(56) References Cited

U.S. PATENT DOCUMENTS

| 2006/0248800 A1* | 11/2006 | Miglin | B01B 1/005 |
| | | | 48/198.7 |
| 2008/0248345 A1* | 10/2008 | Soloveichik | H01M 4/90 |
| | | | 429/483 |
| 2009/0246575 A1* | 10/2009 | Zhao | B01J 31/121 |
| | | | 429/421 |
| 2010/0055513 A1* | 3/2010 | Soloveichik | H01M 4/90 |
| | | | 429/483 |

FOREIGN PATENT DOCUMENTS

| CN | 104973567 A | 10/2015 |
| CN | 104973568 A | 10/2015 |
| CN | 104975988 A | 10/2015 |
| CN | 104979574 A | 10/2015 |
| JP | 2005216774 | * 8/2005 |
| JP | 2011251858 | * 12/2011 |
| WO | 2014086551 A1 | 6/2014 |

* cited by examiner

DEHYDROGENATION REACTION SYSTEM FOR LIQUID HYDROGEN SOURCE MATERIAL

BACKGROUND

Technical Field

The present invention relates to the technical field of organic liquid hydrogen storage, in particular to a normal-pressure and temperature dehydrogenation system for a liquid hydrogen source material.

Background of the Invention

One of the greatest challenges facing the human being in this century is developing new energy to replace or partially replace nonrenewable fossil fuel. In the "12th Five-Year Development Plan for National Strategic Emerging Industries" issued by the State Council last year, new energy represented by hydrogen energy fuel cells and new energy automobiles are listed separately as key industry development directions, and specific development goals and development routes are proposed. For its extensive raw material sources, pollution-free property and high energy conversion efficiency, hydrogen energy is a preferred new energy technology for solving the future clean energy demand problem.

The hydrogen energy technology comprises large-scale preparation, storage, transportation and high-efficiency utilization of hydrogen as well as construction of supporting infrastructure and other links, wherein storage and transportation are key to safe and efficient utilization of hydrogen energy. Currently adopted storage and transportation technologies in the industry mainly include liquified hydrogen storage and transportation at −253° C. and high-pressure hydrogen storage and transportation at 350-700 atm, energy consumption for the high-pressure hydrogen and liquified hydrogen technologies and application thereof is at least 20 times higher than hydrogen production cost, and potential safety hazards including leakage and overhigh pressure of a hydrogen storage tank exist. If hydrogen molecules can be adsorbed onto a certain carrier to achieve safe storage at normal pressure and temperature and hydrogen can be released in a controllable mode under a mild condition in use, hydrogen energy can be used effectively and safely. Therefore, major industrial countries in the world are all researching and developing a liquid organic hydrogen storage technology based on normal-pressure and temperature. Take Germany as an example, a developed liquid organic hydrogen storage technology can achieve hydrogen absorption/desorption circulation under a mild condition, however, the technology has the defect that a hydrogen storage carrier has a high melting point and is solid at normal temperature; and a hydrogen storage technology based on traditional organic materials like methylbenzene is researched and developed in Japan currently, but dehydrogenation temperature is too high (higher than 300° C.), and byproducts can poison fuel cells. Therefore, large-scale application of the two hydrogen storage technologies is limited.

Under the leading of Professor Cheng Hansong from the second batch of "Thousand Talents Program" launched by the Organization Department of the Central Committee of the CPC, based on his original work in the US, the sustainable energy laboratory research team from China University of Geosciences (Wuhan) found a liquid organic conjugated molecule hydrogen storage material after long-term exploration and research, the material is characterized in low melting point (as slow as −20° C. according to the currently developed technology), high flashing point (150° C. or more), high purity (99.99%) of released gas under the action of a self-made efficient catalyst, low dehydrogenation temperature (about 150° C.) and the like, besides, the cycle life is long (2000 times or more), reversibility is high, and gases like carbon monoxide poisoning fuel cells are not generated. As a hydrogen carrier, the material exists in a liquid state all the time in use and can be stored and transported like petroleum at normal pressure and temperature, and an existing gasoline transportation method and an existing gas station structure can be used.

BRIEF DESCRIPTION OF THE INVENTION

The present invention aims to provide a normal-pressure and temperature dehydrogenation system for a liquid hydrogen source material.

To achieve the foregoing objective, the present invention adopts the following technical solution: a dehydrogenation reaction system for a liquid hydrogen source material is characterized by comprising:

a storage device used for storing a liquid hydrogen source material and a liquid hydrogen storage carrier;

a reaction still used for dehydrogenation of the liquid hydrogen source material;

a gas-liquid separator used for separating the products, hydrogen and liquid hydrogen storage carrier which are generated after dehydrogenation of the liquid hydrogen source material;

a buffer tank used for storing hydrogen; and a heating device used for heating the reaction still;

the liquid hydrogen storage carrier comprises at least two different hydrogen storage constituents, the hydrogen storage constituents are unsaturated aromatic hydrocarbons or heterocyclic unsaturated compounds, at least one hydrogen storage constituent is a low-melting-point compound, and the melting point of the low-melting-point compound is lower than 80° C.;

the storage device is provided with a storage space for storing the liquid hydrogen source material and a storage space for storing the liquid hydrogen storage carrier; the reaction still is of a plate type, a tubular type, an insertion sheet type, a tower type or other types;

and the liquid hydrogen source material is input into the reaction still by means of a pump through an input pipe, dehydrogenation reaction of the liquid hydrogen source material is conducted in the reaction still, generated hydrogen is conveyed to the buffer tank, and the liquid hydrogen storage carrier generated after dehydrogenation is conveyed back to the storage device.

The heating device of the reaction still is a waste heat exchanger, an electric heating device, an electromagnetic heating device, a chemical reaction heat supply device or a microwave heating device, a preheating device is arranged outside the input pipe, and the liquid hydrogen source material in the storage device directly enters the reaction still for dehydrogenation reaction after being preheated.

The reaction still is a thin-layer plate type reaction still or a thin-layer tubular type reaction still, and the reaction still is inserted in a support.

The support is of a multilayer structure and provided with a main liquid inlet pipe, a main liquid outlet pipe and a main gas outlet pipe, and each layer is provided with a branch liquid inlet pipe, a branch liquid outlet pipe, a branch gas outlet pipe, a heating device and a reaction still bayonet; the reaction still is provided with a liquid inlet, a liquid outlet and a gas outlet; when the reaction still is inserted into the reaction still bayonets of the support, a reaction still inlet, a reaction still outlet and a hydrogen outlet are connected with the main liquid inlet pipe, the main liquid outlet pipe and the main gas outlet pipe of the support respectively.

Connection valves are arranged at ports of each branch liquid inlet pipe, each branch liquid outlet pipe and each branch gas outlet pipe, and the liquid inlet, the liquid outlet and the gas outlet of the reaction still are connected with each branch liquid inlet pipe, each branch liquid outlet pipe and each branch gas outlet pipe through the connection valves respectively.

The heating device of the reaction still is a waste heat exchanger, an electric heating device, a microwave heating device, an electromagnetic heating device or a chemical reaction heat supply device.

The reaction still comprises a heat insulation layer and one or more reaction units, and the reaction units are wrapped in the heat insulation layer; each reaction unit comprises a reaction section and a heating section, wherein the reaction section is filled with a catalyst, and a heating device is arranged in the heating section; the reaction units are sequentially connected, the reaction raw material enters through the inlet of the reaction still and passes through each of the reaction units in sequence for endothermic reaction, and reaction products are discharged through the outlet of the reaction still; a supporting frame is arranged in the reaction still, the reaction units are fixed to the supporting frame, the reaction units are isolated through sandwich layers, each reaction section is isolated from the corresponding heating section through a sandwich layer, and the sandwich layers are nets, diaphragms or molecular sieves.

The dehydrogenation reaction system is further provided with a first pressure sensor used for detecting the pressure of the reaction still;

a second pressure sensor used for detecting the pressure of the buffer tank;

a liquidometer used for detecting the position of the liquid level in the gas-liquid separator;

a pressure stabilizing valve and a second valve which are arranged between the buffer tank and a hydrogen utilization device;

and a controller used for acquiring signals of the first pressure sensor, the second pressure sensor and the liquidometer and sending control signals when a preset condition is met, wherein the control signals are used for controlling the flow of the raw material and the reaction products in the reaction device and start and stop of dehydrogenation reaction.

The controller controls the flow of the raw material and the reaction products in the reaction device and start and stop of dehydrogenation reaction by controlling start and stop of an input pump arranged at an outlet of the storage device, a hydrogen booster pump arranged at a gas outlet of the gas-liquid separator, a first valve arranged at a liquid outlet of the gas-liquid separator and the heating device, specifically, during normal operation, when the second pressure sensor detects that the pressure of the buffer tank is lower than a first set value, the controller controls the input pump to increase the flow of the liquid hydrogen source material conveyed to the reaction still, dehydrogenation reaction of the liquid hydrogen source material is conducted in the reaction still, and the hydrogen generating speed is increased so as to increase the pressure of the buffer tank; meanwhile, when the first pressure sensor detects that the pressure of the reaction still is higher than a preset value, the controller controls the hydrogen booster pump to be started to enable the internal pressure of the reactor to be lower than set pressure; when the second pressure sensor detects that the pressure in the buffer tank is higher than a second set value, the controller controls the input pump and the heating device outside the reaction still to be stopped so that the reaction still can stop working; when the liquidometer detects that the position of the liquid level in the gas-liquid separator is higher than a set value, the controller controls the first valve to be switched on to enable the liquid hydrogen source material in the gas-liquid separator to flow into the storage device.

The buffer tank is connected with a hydrogen fuel cell.

A heat conduction device is arranged between the reaction still and the heating device, the heat conduction device is connected with a pipeline heat transfer device arranged outside the hydrogen fuel cell through a pipeline, and the heat conduction medium flowing in the heat conduction device and the pipeline heat transfer device is the stored liquid hydrogen source material.

The storage device is connected with the pipeline heat transfer device, the heat conduction device is connected with the reaction still through the input pipe, and the liquid hydrogen source material enters the pipeline heat transfer device arranged outside the hydrogen fuel cell firstly, and then enters the reaction still for dehydrogenation reaction after heat generated by the hydrogen fuel cell is transmitted to the reaction still through the heat conduction device.

The heating device used for heating the reaction still is an electric heater, an electromagnetic heater or a microwave heater.

The dehydrogenation reaction system further comprises a storage battery used for storing electric energy generated by the hydrogen fuel cell, and electric energy is consumed by the input pump, the preheating device and reaction still system equipment or output.

The heating device is a hydrogen fuel heat utilization device, the hydrogen fuel heat utilization device is connected with the reaction still, and part of hydrogen generated by the reaction still and purging tail gas of the hydrogen fuel cell are converted into heat energy in the hydrogen fuel heat utilization device to be supplied to the reaction still.

The hydrogen fuel heat utilization device transmits heat energy generated from hydrogen combustion to the dehydrogenation reaction still through a heat conduction medium by means of a heat exchange pipe arranged outside or inside the reaction still, and the heat conduction medium is heat conduction oil or metal salt bath; or the reaction still and the hydrogen fuel heat utilization device are integrated into a whole, and the hydrogen fuel heat utilization device transmits heat energy generated from hydrogen combustion to the dehydrogenation reaction still.

The buffer tank is connected with a hydrogen internal combustion engine.

The dehydrogenation reaction system is further provided with an oxygen storage tank used for storing oxygen, and hydrogen and oxygen are simultaneously conveyed into the hydrogen internal combustion engine.

A heat dissipation device is arranged outside the hydrogen internal combustion engine, and is connected with the heating device outside the reaction still through a pipeline to transmit heat through a heat conduction medium flowing in the heat dissipation device and the heating device.

The storage device is connected with the heat dissipation device, the heating device is connected with the reaction still through the input pipe, and the heat conduction medium is the liquid hydrogen source material.

According to the normal-pressure and temperature dehydrogenation system for the liquid hydrogen source material, the size and the form of equipment in the system can be determined according to the application field, for example, the storage device for storing the liquid hydrogen source material and the liquid hydrogen storage carrier generated after dehydrogenation can be two separate units or one container divided by a movable partition board, and the purpose of the present invention can be realized through both ways. However, if the dehydrogenation system is applied to a motor vehicle system, the latter is preferred from the perspective of saving the space of a motor vehicle, that is to say, the storage device is one storage tank which is divided by a movable or fixed partition board in the middle. The reaction still can be of a plate type, a tubular type or a tower type as needed, if the dehydrogenation system is applied to a motor vehicle system, the dehydrogenation reaction device is of an insertion sheet type from the perspective of saving the space of the motor vehicle, so that more space can be saved. The number of insertion sheets can be customized and adjusted according to the power requirement of the motor vehicle. Due to the fact that the hydrogen internal combustion engine can generate a temperature as high as 400° C. in work, the hydrogen fuel cell can generate a temperature of 50-100° C. in work, the liquid hydrogen source material requires a temperature of 120-250° C. for dehydrogenation reaction, and the liquid hydrogen source material has the property of being stable in performance at 300° C., the liquid hydrogen source material is used as a heat conduction medium to cool the hydrogen internal combustion engine or the hydrogen fuel cell and transmit heat to the dehydrogenation reaction still at the same time, and the liquid hydrogen source material continues to enter the reaction still for dehydrogenation chemical reaction after transmitting heat.

The normal-pressure and temperature dehydrogenation system for the liquid hydrogen source material is used for dehydrogenation reaction of the liquid hydrogen source material, and generated hydrogen can be supplied to fuel cells or internal combustion engines to be converted into electric energy or mechanical energy so as to be applied to automobiles, power supplies, energy storage, chemical engineering, pharmacy, mobility and other industrial and civil fields.

DETAILED DESCRIPTION OF THE INVENTION

Figure 1:
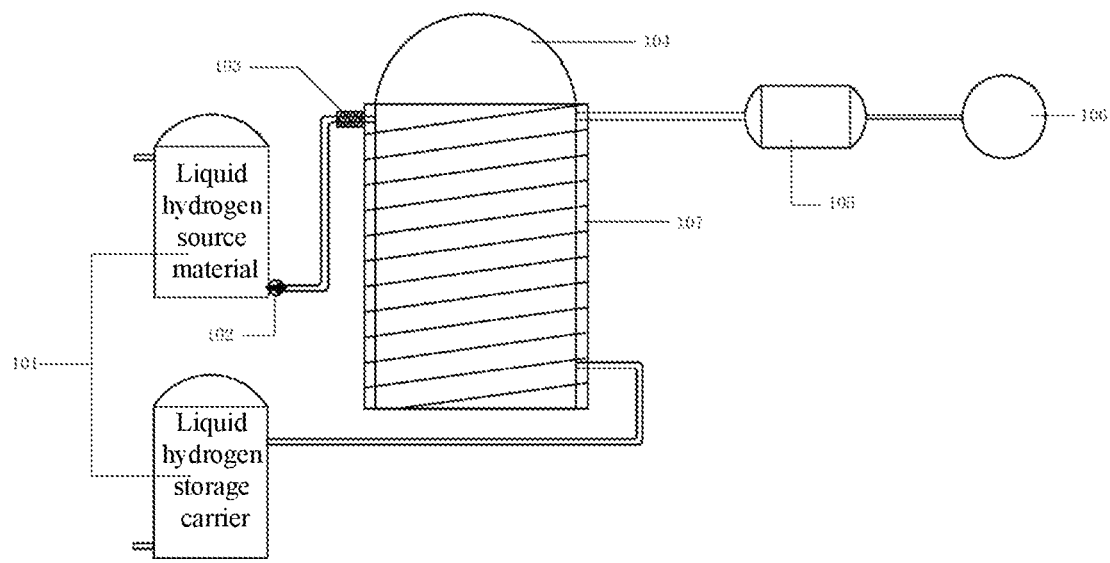
FIG. 1 is a structure diagram of a dehydrogenation reaction system according to a first embodiment of the present invention.

The present invention is further described with reference to accompanying drawings and embodiments.

A liquid hydrogen storage carrier is a hydrogen storage system which can be in a liquid state at normal pressure and temperature, and comprises at least two different hydrogen storage constituents, the hydrogen storage constituents are unsaturated aromatic hydrocarbons or heterocyclic unsaturated compounds, at least one hydrogen storage constituent is a low-melting-point compound, and the melting point of the low-melting-point compound is lower than 80° C.

Further, the hydrogen storage constituents are selected from heterocyclic unsaturated compounds, and heteroatoms in the heterocyclic unsaturated compounds are one or more of N, S, O and P.

Further, the total number of heterocyclic rings and aromatic rings in the heterocyclic unsaturated compounds is 1-20, and the total number of the heteroatoms is 1-20.

Further, relative to the total mass of the liquid hydrogen storage system, the mass fraction of low-melting-point compounds is 5-95%.

Further, the liquid hydrogen storage system also comprises a hydrogenation additive, and the hydrogenation additive is a polar solvent and/or a non-polar solvent.

Further, relative to each gram of hydrogen storage constituents, the adding amount of the hydrogenation additive is 0.1-10 ml.

Further, different hydrogen storage constituents are selected from benzene, methylbenzene, ethylbenzene, o-xylene, p-xylene, styrene, phenylacetylene, anthracene, naphthalene, fluorene, aniline, carbazole, N-methylcarbazole, N-ethylcarbazole, N-propyl carbazole, N-isopropyl carbazole, N-butyl carbazole, indol, N-methylindole, N-ethylindole, N-propylindole, quinoline, isoquinoline, pyridine, pyrrole, furan, benzofuran, thiophene, pyrimidine, imidazole and derivatives thereof.

Further, the polar solvent is selected from one or more of ethanol, methyl alcohol, diethyl ether, methyl ether, acetonitrile, ethyl acetate, formamide, isopropyl alcohol, n-butyl alcohol, dioxane, n-butyl ether, isopropyl ether, dichloromethane, chloroform and dichloroethane.

Further, the non-polar solvent is selected from one or more of n-hexane, n-pentane, cyclohexane, mesitylene, carbon disulfide, petroleum ether and carbon tetrachloride.

Further, the hydrogen storage system also comprises a dehydrogenation additive, and the dehydrogenation additive is selected from one or more of decalin, mesitylene, petroleum ether and phenylate.

Further, relative to each gram of hydrogen storage constituents, the adding amount of the dehydrogenation additive is 0.1-10 ml.

A liquid hydrogen source material is generated through hydrogenation chemical reaction of the liquid hydrogen storage carrier under the action of a hydrogenation catalyst, and the liquid hydrogen source material is reduced into the liquid hydrogen storage carrier through dehydrogenation chemical reaction under the action of a dehydrogenation catalyst.

A storage device used for storing the liquid hydrogen source material and the liquid hydrogen storage carrier can be a storage tank or other forms, and can be a miniature type, vehicle-mounted type or large storage tank in terms of size. The storage device can be provided with a space for storing the liquid hydrogen source material and a space for storing the liquid hydrogen storage carrier, namely a first storage room and a second storage room, and the first storage room and the second storage room are each provided with an input port and an output port. The output port of the first storage room is provided with an input pump, and the liquid hydrogen source material is input into a reaction still through operation of the input pump. The storage device can also be composed of storage tanks storing the liquid hydrogen source material and the liquid hydrogen storage carrier respectively, and each storage tank is provided with an input port and an output port.

A preheating device can be arranged outside a connection pump and an input pipe of the reaction still, and the preheating device can be of an electric heating type or other types and can preheat the liquid hydrogen source material input into the reaction still to 150° C.

The reaction still can be of a plate type, a tubular type, a tower type or other types, and is filled with the dehydrogenation catalyst. The reaction still is provided with a heating device used for heating the reaction still, the heating device can be a waste heat exchanger, a microwave heating device, an electric heating device, a heat utilization device or other heating devices, and the heat utilization device is a device conducting heating by means of heat generated from combustion of fuel like hydrogen, natural gas, liquefied gas, gasoline or diesel oil, so that dehydrogenation reaction of the liquid hydrogen source material can be conducted at 120-250° C.

In the dehydrogenation process, the liquid hydrogen source material stored in the storage device is input into the reaction still through a pump, and reacts at 120-250° C. and 0-1 MPa under the action of the dehydrogenation catalyst to generate hydrogen and the liquid hydrogen storage carrier, hydrogen is sent to a buffer tank, and the liquid hydrogen storage carrier is sent back to the storage device.

In a plate type reaction still or a tubular type reaction still, the reaction still can be a thin-layer plate type reaction still or a thin-layer tubular type reaction still, and the reaction still is inserted in a support. The support is of a multilayer structure and provided with a main liquid inlet pipe, a main liquid outlet pipe and a main gas outlet pipe, and each layer is provided with a branch liquid inlet pipe, a branch liquid outlet pipe, a branch gas outlet pipe, a heating device and a reaction still bayonet. The reaction still is provided with a liquid inlet, a liquid outlet and a gas outlet; when the reaction still is inserted into the reaction still bayonets of the support, a reaction still inlet, a reaction still outlet and a hydrogen outlet are connected with the main liquid inlet pipe, the main liquid outlet pipe and the main gas outlet pipe of the support respectively. Connection valves are arranged at ports of each branch liquid inlet pipe, each branch liquid outlet pipe and each branch gas outlet pipe, and the liquid inlet, the liquid outlet and the gas outlet of the reaction still are connected with each branch liquid inlet pipe, each branch liquid outlet pipe and each branch gas outlet pipe through the connection valves respectively. Here, the reaction still heating device can be various heating devices such as a waste heat exchanger, an electric heating device, a microwave heating device, an electromagnetic heating device and a chemical reaction heat supply device. The plate type reaction still is of a thin-layer structure; to guarantee the efficiency of catalytic reaction, the reaction still can not be too thick, so as to avoid instable reaction and low efficiency caused by the existence of gradient. The reaction still can be inserted into the support as needed, and the support is of a multilayer structure and can allow one or more reaction stills to be inserted therein. The connection valves of the branch liquid inlet pipe, the branch liquid outlet pipe and the branch gas outlet pipe of each layer of the support are in a connected state when connected with the liquid inlet, the liquid outlet and the gas outlet of the reaction still, otherwise in a closed stated. The heating device is arranged at the front end of the reaction still, or when the number of the heating devices is more than one, the multiple heating devices are arranged outside the reaction still at equal intervals, and the heating devices heat the reaction still in a segmented mode.

Due to the fact that dehydrogenation reaction is endothermic reaction and dehydrogenation reaction of the liquid hydrogen source material can be maintained only when the temperature of the reaction still is kept at 120-250° C., the heating device is arranged on the support and located outside the whole reaction still or at the front end of the reaction still. Due to the fact that the efficiency of dehydrogenation reaction of the liquid hydrogen source material is the highest under the segmented heating condition, the number of the heating devices is more than one preferably, the multiple heating devices are arranged outside the reaction still at equal intervals, and the heating devices heat the reaction still in a segmented mode.

The tower type reaction still can also adopt a modular design, the reaction still comprises a heat insulation layer and one or more reaction units, and the reaction units are wrapped in the heat insulation layer. Each reaction unit comprises a reaction section and a heating section, wherein the reaction section is filled with the catalyst, and the heating device is arranged in the heating section. The reaction units are sequentially connected, the reaction raw material enters through the inlet of the reaction still and passes through each of the reaction units in sequence for endothermic reaction, and reaction products are discharged through the outlet of the reaction still. A supporting frame is arranged in the reaction still, the reaction units are fixed to the supporting frame, the reaction units are isolated through sandwich layers, and each reaction section is isolated from the corresponding heating section through a sandwich layer. The sandwich layers are nets, diaphragms or molecular sieves. Here, the heating device is an electric heater, an infrared heater, an electromagnetic heater, a microwave heater or a pipeline heater. The reaction still can be provided with a temperature controller to be used for controlling the temperature of each heating device. The catalyst is granular, and filling is conducted by means of a fixed bed, a fluidized bed and the like. The heat insulation layer comprises an inner heat insulation layer, an outer heat insulation layer and a heat insulation material filled between the inner layer and the outer layer, the portion between the inner heat insulation layer and the outer heat insulation layer is vacuumized, and the inner heat insulation layer is coated with a heat radiation reflective coating or is wound by a heat radiation reflective material.

The reactant is heated to a proper temperature through the heating sections and then reacts under the action of the catalyst, the number of the reaction units, the heat insulation mode and the heating mode can be selected according to the actual requirements of reaction, the heating devices are independently controlled, the actual heat compensation temperature and heat quantity of each heating layer are controlled independently as needed, a heat exchanger can be added according to the actual situation, the utilization rate of energy is increased greatly, reaction is made more complete and controllable, and side reaction caused by local overheating can be avoided during heating. Heat exchange is conducted on gas-liquid with heat energy and generated after reaction and the raw material at the inlet, so as to effectively increase the utilization rate of energy.

The liquid hydrogen source material is catalyzed and decomposed into hydrogen and the liquid hydrogen storage carrier in the reaction still, the reaction products are input into a gas-liquid separator to be separated first, generated hydrogen is conveyed to a buffer tank, and the liquid hydrogen storage carrier is conveyed back to the space for storing the liquid hydrogen storage carrier.

The dehydrogenation process of the liquid hydrogen source material can be controlled so as to obtain stable hydrogen amount. The dehydrogenation system can be provided with a first pressure sensor used for detecting the pressure of the reaction still; a second pressure sensor used for detecting the pressure of the buffer tank; a liquidometer used for detecting the position of the liquid level in the gas-liquid separator; and a controller used for acquiring signals of the first pressure sensor, the second pressure sensor and the liquidometer and sending control signals when a preset condition is met, wherein the control signals are used for controlling the flow of the raw material and the reaction products in the reaction device and start and stop of dehydrogenation reaction. A preheater used for preheating the liquid hydrogen source material is arranged between the material storage box and the reaction still. The dehydrogenation system further comprises a pressure stabilizing valve and a second valve which are arranged between the buffer tank and a hydrogen utilization device. The controller is a PLC, a single-chip microcomputer or a DCS.

The storage device is connected with the preheater through the input pump, the preheater is connected with the reaction still, the reaction still is connected with the gas-liquid separator, a gas outlet of the gas-liquid separator is connected with the buffer tank, a liquid outlet is connected with the material storage tank, and the buffer tank is connected with a hydrogen fuel cell. The reaction still is provided with the heating device, and the whole system is controlled by the PLC.

The first pressure sensor is arranged in the reaction still to be used for detecting the pressure of the reaction still. The second pressure sensor is arranged in the buffer tank to be used for detecting the pressure of the buffer tank. The liquidometer is arranged in the gas-liquid separator to be used for detecting the position of the liquid level in the gas-liquid separator. The signals of the first pressure sensor, the second pressure sensor and the liquidometer are sent to the PLC, and the control signals are sent when the preset condition is met to control the start and stop of the input pump arranged on a material storage box and preheater pipeline, a hydrogen booster pump arranged at the gas outlet of the gas-liquid separator, a first valve arranged at the liquid outlet of the gas-liquid separator, and the heating device. The pressure stabilizing valve and the second valve are arranged between the buffer tank and the hydrogen utilization device.

During normal operation, when the second pressure sensor detects that the pressure of the buffer tank is lower than a first set value, the PLC controls the input pump to increase the flow of the liquid hydrogen source material conveyed to the preheater, the liquid hydrogen source material is conveyed to the reaction still filled with the dehydrogenation catalyst after being preheated, dehydrogenation reaction of the liquid hydrogen source material is conducted in the reaction still, in this way, the hydrogen generating speed is increased so that the pressure of the buffer tank is increased. Hydrogen is input into the hydrogen fuel cell through the pressure stabilizing valve and the second valve.

Meanwhile, when the first pressure sensor detects that the pressure of the reaction still is higher than a set value, the PLC controls the hydrogen booster pump to be started, so that the internal pressure of the reactor is lower than set pressure.

When the second pressure sensor detects that the pressure in the buffer tank is higher than a second set value, the PLC controls the input pump and the heating device outside the reaction still to be stopped, so that the reaction still can stop working.

When the liquidometer detects that the position of the liquid level in the gas-liquid separator is higher than a set value, the PLC controls the first valve to be switched on, so that the liquid hydrogen storage carrier in the gas-liquid separator flows into the material storage box.

The liquid hydrogen source material and the liquid hydrogen storage carrier are stored in the material storage tank, the material storage tank is provided with the space for storing the liquid hydrogen source material and the space for storing the liquid hydrogen storage carrier, namely the first storage room and the second storage room, and the two storage rooms are separated through a movable partition board.

By switching on the second valve, hydrogen stored in the buffer tank is conveyed into the hydrogen fuel cell for starting, during normal operation, when the second pressure sensor detects that the pressure in the buffer tank is lower than the first set value, the flow of the liquid hydrogen source material input by the input pump is increased through the PLC, the liquid hydrogen source material is conveyed into the preheater through a conveyance pump to be preheated to 100-250° C. and then enters the reaction still for dehydrogenation chemical reaction at 120-250° C. under the action of the dehydrogenation catalyst, and the reaction products enter the gas-liquid separator.

When the first pressure sensor detects that the pressure in the reaction still is higher than the set value, the hydrogen booster pump is started under the control of the PLC, hydrogen in the gas-liquid separator is stored in the buffer tank through the hydrogen booster pump, pressure in the buffer tank is 0.03-1 MPa, and pressure in the reaction still is ordinary pressure or micro-negative pressure. Hydrogen is conveyed to the hydrogen fuel cell through the pressure stabilizing valve at the pressure of 0.03-0.06 MPa.

The liquid hydrogen storage carrier in the gas-liquid separator reaches a set liquid level and then is conveyed back to the second storage room of the material storage box by controlling the opening degree of the first valve through the PLC.

When the second pressure sensor detects that the pressure in the buffer tank is lower than the first set value, the flow of the input pump is increased under the control of the PLC, and the flow of the liquid hydrogen source material for dehydrogenation reaction is increased.

When the second pressure sensor detects that the pressure in the buffer tank is higher than the second set value, the input pump and the heating device outside the reaction still are stopped under the control of the PLC, so as to stop dehydrogenation reaction.

After the second valve is switched off and the hydrogen utilization device stops working, dehydrogenation reaction is slowed down and stops finally, and hydrogen generated during this period can be input into the buffer tank through the hydrogen booster pump to be used in the next time of starting.

Hydrogen can be conveyed to the hydrogen fuel cell from the buffer tank to be converted into electric energy. Here, the reaction still heating device is a waste heat exchanger, an electric heating device, a microwave heating device, an electromagnetic heating device or a chemical reaction heat supply device. A preheating device can also be arranged between the hydrogen source material storage tank and the reaction still. The liquid hydrogen source material in the storage tank directly enters the reaction still for dehydrogenation reaction after being preheated.

Or, a heat conduction device is arranged between the reaction still and the heating device, the heat conduction device is connected with a pipeline heat transfer device arranged outside the hydrogen fuel cell through a pipeline, and the heat conduction medium flowing in the heat conduction device and the pipeline heat transfer device is the stored liquid hydrogen source material.

The liquid hydrogen source material enters the pipeline heat transfer device arranged outside the hydrogen fuel cell firstly, and then enters the reaction still for dehydrogenation reaction after heat generated by the hydrogen fuel cell is transmitted to the reaction still through the heat conduction device.

The hydrogen fuel cell can generate a temperature of 50-100° C. during working, while the liquid hydrogen source material requires a temperature of 120-250° C. for dehydrogenation reaction. Heat energy generated by the hydrogen fuel cell can be fully utilized.

When hydrogen energy is converted into electric energy, a storage battery can also be arranged to store electric energy generated by the hydrogen fuel cell, and electric energy can be consumed by the pump, the preheating device and other system equipment or output. The liquid hydrogen source material stored in the storage device is conveyed to the preheating device through the input pump to be heated and then enters the reaction still to generate hydrogen and the liquid hydrogen storage carrier at a certain temperature under the action of the catalyst, after the products are separated in the gas-liquid separator, the liquid hydrogen storage carrier is conveyed back to the storage device, and hydrogen enters the buffer tank; certain pressure is generated from dehydrogenation reaction, certain pressure also exists when the buffer tank is connected with the dehydrogenation reaction still, hydrogen is converted into electric energy after entering the hydrogen fuel cell, part of the generated electric energy is consumed by the pump, the heating device and other system equipment, and the rest is output; in use, part of electric energy is stored in the storage battery to be used in the next time of starting.

Due to the fact that the main ingredient of purging tail gas of the hydrogen fuel cell is hydrogen and the dehydrogenation reaction still in the dehydrogenation system needs heat during working, if hydrogen generated by a hydrogen supply system is used for generating electricity through a fuel cell and electricity is converted into heat through a device to be supplied to the dehydrogenation system, the rated power of the used fuel cell can be increased and the heat utilization rate of hydrogen combustion is high on the premise that net output power is unchanged. Therefore, the heating device for heating the reaction still can be a hydrogen fuel heat utilization device, the hydrogen fuel heat utilization device is connected with the reaction still, and part of hydrogen generated by the reaction still and purging tail gas of the hydrogen fuel cell are converted into heat energy in the hydrogen fuel heat utilization device to be supplied to the reaction still. The hydrogen fuel heat utilization device transmits heat energy generated from hydrogen combustion to the dehydrogenation reaction still through a heat conduction medium by means of a heat exchange pipe arranged outside or inside the reaction still, and the heat conduction medium is heat conduction oil or metal salt bath; or the dehydrogenation reaction still and the hydrogen fuel heat utilization device in a dehydrogenation heat utilization device are integrated into a whole, and the hydrogen fuel heat utilization device transmits heat energy generated from hydrogen combustion to the dehydrogenation reaction still, so that the utilization rate of energy can be increased.

Hydrogen can be conveyed to a hydrogen internal combustion engine from the buffer tank to be converted into mechanical energy. Due to the fact that hydrogen amount provided by unit volume of liquid hydrogen source material is higher than that of the high-pressure hydrogen storage technology and the solid hydrogen storage technology, the space for storing the liquid hydrogen source material can be reduced greatly, in this way, enough space can be reserved for installing an oxygen tank when the dehydrogenation system is applied to fields like automobiles, trains and ships. On a hydrogen energy automobile using a hydrogen internal combustion engine in the prior art, due to the fact that there is no space for installing an oxygen tank, hydrogen in the hydrogen internal combustion engine directly reacts with oxygen in the air, and nitrogen in the air reacts with oxygen at high temperature to generate nitride oxides which are carcinogenic. Nitride oxides can be generated easily especially in a plateau section where the content of oxygen in the air is low. According to the dehydrogenation system of the present invention, oxygen directly enters the hydrogen internal combustion engine for reaction, nitride oxides can not be generated, installation of a tail gas treatment device is not needed, cost is greatly saved, more energy is saved, and environment friendliness is better achieved.

Besides, much energy is released in the form of heat during working of the internal combustion engine, operating temperature can reach 400° C. or more, and according to existing gasoline, diesel oil and gas internal combustion engines, heat is taken away by a cooling system and then dissipated to cause waste. Dehydrogenation reaction is an endothermic process and reaction temperature is 120-250° C., heat released by the internal combustion engine can be utilized through a heat exchange system, especially the hydrogen source material itself is used as a condensing agent, and thus the effects of cooling and increasing the utilization rate of energy are realized in the whole process. A heat dissipation device is arranged outside the hydrogen internal combustion engine and connected with the heating device outside the reaction still through a pipeline. The storage device is connected with the heat dissipation device when the hydrogen source material itself is used as the condensing agent, the heating device is connected with the reaction still through the input pipe, and the heat conduction medium is the liquid hydrogen source material.

First Embodiment

As shown in FIG. 1, the storage device is composed of storage tanks, the liquid hydrogen source material and the liquid hydrogen storage carrier are stored in the different storage tanks 101 respectively, each storage tank is provided with an input port and an output port, the pump 102 is arranged at the output port of the storage tank storing the liquid hydrogen source material, the preheating device 103 is arranged outside the connection pump and the input pipe of the reaction still, and the preheating device is an electric heating device. The liquid hydrogen source material is input into the reaction still 104 through operation of the pump. The reaction still is a tower type reaction still and filled with the dehydrogenation catalyst. The liquid hydrogen source material is decomposed into hydrogen and the liquid hydrogen storage carrier in the reaction still, and the liquid hydrogen storage carrier is conveyed back to the space for storing the hydrogen storage carrier. Hydrogen is conveyed to the buffer tank 105 and then conveyed to the hydrogen fuel cell 106 from the buffer tank. The electric heating device 107 is arranged outside the reaction still to maintain the temperature of the reaction still to be 120-250° C.

Second Embodiment

Figure 2:
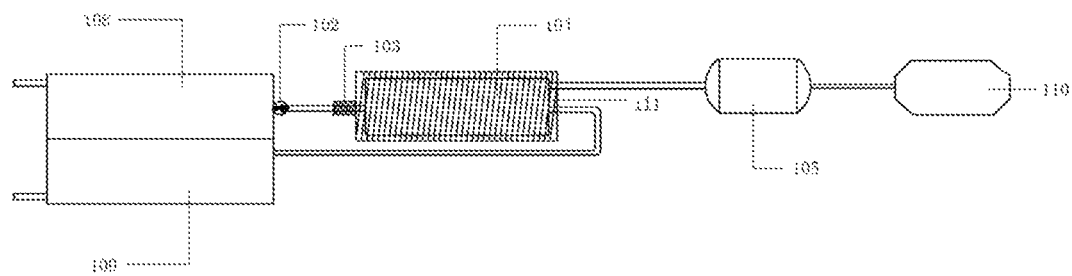
FIG. 2 is a structure diagram of a dehydrogenation reaction system according to a second embodiment of the present invention.

As shown in FIG. 2, the storage device is a vehicle-mounted storage tank, the storage tank is provided with a space for storing the liquid hydrogen source material and a space for storing the liquid hydrogen storage carrier, namely the first storage room 108 and the second storage room 109, and the first storage room and the second storage room are each provided with an input port and an output port. The pump 102 is arranged at the output port of the first storage room, the preheating device 103 is arranged outside the connection pump and the input pipe of the reaction still, and the preheating device is an electric heating device supplied with power by a storage battery. The liquid hydrogen source material is input into the reaction still 104 through operation of the pump. The reaction still is a plate type reaction still and filled with the dehydrogenation catalyst. The liquid hydrogen source material is decomposed into hydrogen and the liquid hydrogen storage carrier in the reaction still, and the liquid hydrogen storage carrier is conveyed back to the second storage room for storing the liquid hydrogen storage carrier. Hydrogen is conveyed to the buffer tank 105 and then conveyed to the hydrogen internal combustion engine 110 from the buffer tank. The microwave heating device 111 is arranged outside the reaction still to maintain the temperature of the reaction still to be 120-250° C.

Third Embodiment

The storage device is a minitype storage tank, the storage tank is provided with a space for storing the liquid hydrogen source material and a space for storing the liquid hydrogen storage carrier, namely the first storage room and the second storage room, and the first storage room and the second storage room are each provided with an input port and an output port. The pump is arranged at the output port of the first storage room.

The liquid hydrogen source material is input into the pipeline heat transfer device arranged outside the hydrogen internal combustion engine through the pump, and enters the reaction still for dehydrogenation reaction after heat generated by the hydrogen internal combustion engine is transmitted to the reaction still through the heating device, and the reaction still is a tubular type reaction still and filled with the dehydrogenation catalyst. The liquid hydrogen source material is decomposed into hydrogen and the hydrogen storage carrier in the reaction still, and the hydrogen storage carrier is conveyed back to the space for storing the hydrogen storage carrier. Hydrogen is conveyed to the buffer tank and then conveyed to the hydrogen internal combustion engine from the buffer tank. The electric heating device is arranged outside the reaction still to maintain the temperature of the reaction still to be 120-250° C.

Fourth Embodiment

Figure 3:
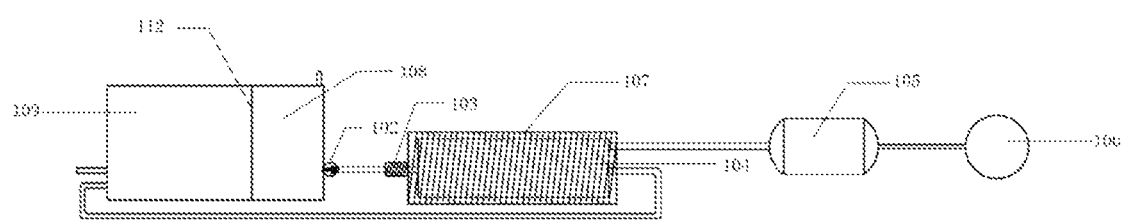
FIG. 3 is a structure diagram of a dehydrogenation reaction system according to a fourth embodiment of the present invention.

It can be seen from FIG. 3 that the dehydrogenation reaction system comprises the storage tank used for storing the liquid hydrogen source material and the liquid hydrogen storage carrier, the reaction still 104 used for dehydrogenation of the liquid hydrogen source material, the buffer tank 105 used for storing hydrogen, the electric heating device 107 used for heating the reaction still, and the hydrogen fuel cell 106.

The storage tank used for storing the liquid hydrogen source material and the liquid hydrogen storage carrier is provided with a space for storing the liquid hydrogen source material and a space for storing the liquid hydrogen storage carrier, namely the first storage room 108 and the second storage room 109, and the two storage rooms are separated through the movable partition board 112. The first storage room and the second storage room are each provided with an input port and an output port, the pump 102 is arranged at the output port of the first storage room, and the liquid hydrogen source material is input into the reaction still through operation of the pump. The reaction still can be a plate type reaction still and filled with the dehydrogenation catalyst. The plate type reaction still can be of an insertion sheet type, and the number of insertion sheets can be increased according to the requirement of vehicle displacement.

The preheating device 103 is arranged outside the connection pump and the input pipe of the reaction still and aims to increase the efficiency and the speed of dehydrogenation reaction in the specific application process. The preheating device can be of an electric heating type or other types, and can preheat the liquid hydrogen source material input into the reaction still to 150° C.

The liquid hydrogen source material is decomposed into hydrogen and the liquid hydrogen storage carrier in the reaction still, and the liquid hydrogen storage carrier is conveyed back to the second storage room, for storing the liquid hydrogen storage carrier, of the hydrogen storage tank. Due to the fact that the two storage rooms are separated through the movable partition board, after the liquid hydrogen source material is output, the space of the first storage room is reduced, and the space of the second storage room is increased and can be used for storing the liquid hydrogen storage carrier which is conveyed back, so that space is saved. After the liquid hydrogen source material is dehydrogenized to generate the liquid hydrogen storage carrier, the liquid hydrogen storage carrier can be pumped out through the output port of the second storage room, and the liquid hydrogen source material is input into the first storage room through the input port at the same time.

Hydrogen generated by the reaction still is conveyed to the buffer tank and then enters the hydrogen fuel cell. Due to the fact that dehydrogenation reaction of the liquid hydrogen source material can be maintained only when the temperature of the reaction still is 120-250° C., the heating device is arranged outside the reaction still, and the heating device is an electric heater.

The liquid hydrogen source material is input into the reaction still by the hydrogen storage device through the pump via the input pipe, hydrogen generated from dehydrogenation of the liquid hydrogen source material is conveyed to the buffer tank and the liquid hydrogen storage carrier generated from dehydrogenation is conveyed back to the hydrogen storage tank through the reaction still, hydrogen in the buffer tank is sent into the hydrogen fuel cell, in this way, chemical energy is converted into electric energy, and electric energy is further converted into kinetic energy to drive an engine to run.

Fifth Embodiment

Figure 4:
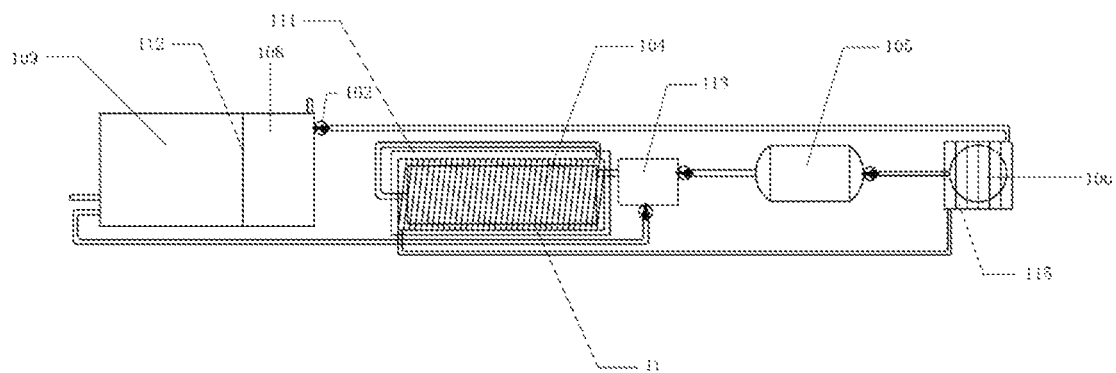
FIG. 4 is a structure diagram of a dehydrogenation reaction system according to a fifth embodiment of the present invention.

It can be seen from FIG. 4 that the dehydrogenation reaction system comprises the storage tank used for storing the liquid hydrogen source material and the liquid hydrogen storage carrier, the reaction still 104 used for dehydrogenation of the liquid hydrogen source material, the buffer tank 105 used for storing hydrogen, the gas-liquid separator 113, the microwave heating device 111, the heat conduction device 114 and the hydrogen fuel cell 106.

The storage tank used for storing the liquid hydrogen source material and the liquid hydrogen storage carrier is provided with a space for storing the liquid hydrogen source material and a space for storing the liquid hydrogen storage carrier, namely the first storage room 108 and the second storage room 109, and the two storage rooms are separated through the movable partition board 112. The first storage room and the second storage room are each provided with an input port and an output port, the pump 102 is arranged at the output port of the first storage room, and the liquid hydrogen source material is output via the input pipe through the operation of the pump. The heat conduction device is arranged between the reaction still and the heating device, the heat conduction device is connected with the pipeline heat transfer device 115 arranged outside the hydrogen fuel cell through a pipeline, and the heat conduction medium flowing in the heating device and the pipeline heat transfer device is the stored liquid hydrogen source material.

The liquid hydrogen source material is input into the pipeline heat transfer device arranged outside the hydrogen internal combustion engine through the pump, and enters the reaction still for dehydrogenation reaction after heat generated by the hydrogen internal combustion engine is transmitted to the reaction still through the heating device, and the reaction still is a tubular type reaction still and filled with the dehydrogenation catalyst. The liquid hydrogen source material is catalyzed and decomposed in the reaction still, the reaction products are input into the gas-liquid separator to be separated into hydrogen and the liquid hydrogen storage carrier, and the liquid hydrogen storage carrier is conveyed back to the space for storing the hydrogen storage carrier. Hydrogen is conveyed to the buffer tank and then conveyed to the hydrogen fuel cell from the buffer tank. However, due to the fact that heat released by the hydrogen fuel cell is 50-100° C. which is not high enough for maintaining the reaction of the reaction still, the microwave heating device is arranged outside the reaction still to keep the temperature of the reaction still at 120-250° C.

Sixth Embodiment

Figure 5:
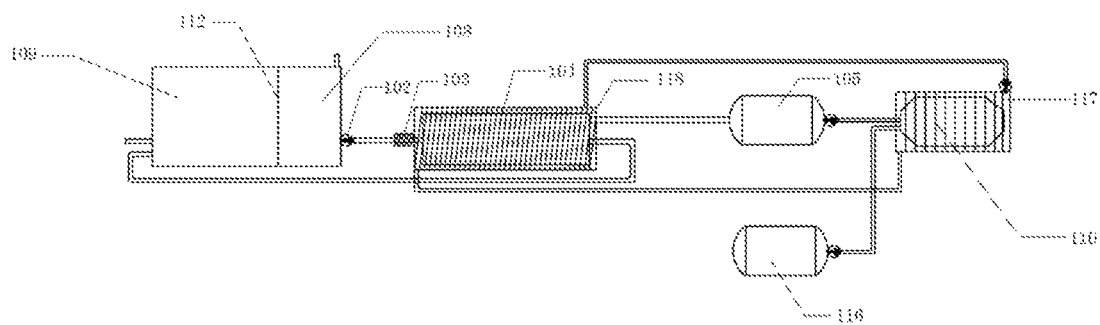
FIG. 5 is a structure diagram of a dehydrogenation reaction system according to a sixth embodiment of the present invention.

It can be seen from FIG. 5 that the hydrogen storage tank used for storing the liquid hydrogen source material and the liquid hydrogen storage carrier is provided with a space for storing the liquid hydrogen source material and a space for storing the liquid hydrogen storage carrier, namely the first storage room 108 and the second storage room 109, and the two storage rooms are separated through the movable partition board 112. The first storage room and the second storage room are each provided with an input port and an output port, the pump 102 is arranged at the output port of the first storage room, and the liquid hydrogen source material is input into the reaction still 104 via the input pipe through the operation of the pump. The reaction still is a plate type reaction still and filled with the dehydrogenation catalyst.

The preheating device 103 is arranged outside the connection pump and the input pipe of the reaction still, and the preheating device is an electric heater and can preheat the liquid hydrogen source material input into the reaction still to 150° C.

The liquid hydrogen source material is catalyzed and decomposed in the reaction still, and the liquid hydrogen storage carrier is conveyed back to the second storage room, for storing the liquid hydrogen storage carrier, of the hydrogen storage tank. Due to the fact that the two storage rooms are separated through the movable partition board, after the liquid hydrogen source material is output, the space of the first storage room is reduced, and the space of the second storage room is increased and can be used for storing the liquid hydrogen storage carrier which is conveyed back, so that space is saved. After the liquid hydrogen source material is dehydrogenized to generate the liquid hydrogen storage carrier, the liquid hydrogen storage carrier can be pumped out through the output port of the second storage room, and the liquid hydrogen source material is input into the first storage room through the input port at the same time.

Hydrogen generated in the reaction still is conveyed to the buffer tank 105 and then enters the hydrogen internal combustion engine 110, hydrogen and oxygen in the oxygen storage tank 116 are input into the hydrogen internal combustion engine through the pump at the same time according to the mass ratio of 1:8, and conversion from chemical energy to mechanical energy is conducted on hydrogen and oxygen in the hydrogen internal combustion engine, so as to drive transportation facilities like automobiles and ships to run. The hydrogen internal combustion engine can generate a high temperature around 400° C., the reaction still requires a temperature as high as 120-250° C. to maintain dehydrogenation reaction of the liquid hydrogen source material, and thus the heat exchange devices are arranged outside the hydrogen internal combustion engine and the reaction still: the heat dissipation device 117 arranged outside the hydrogen internal combustion engine and the heater 118 arranged outside the reaction still. The heat dissipation device and the heater are connected through a pipeline, and the heat conduction medium cools the hydrogen internal combustion engine and heats the reaction still. Through heat exchange, heat energy generated by the hydrogen internal combustion engine can be fully utilized. The pump is arranged on the pipeline to guarantee the flow of the heat conduction medium between the heat dissipation device and the heater.

Seventh Embodiment

Figure 6:
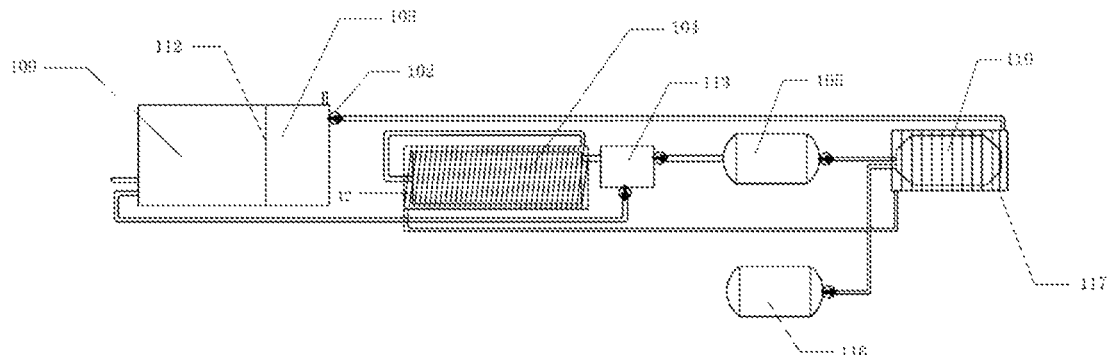
FIG. 6 is a structure diagram of a dehydrogenation reaction system according to a seventh embodiment of the present invention.

It can be seen from FIG. 6 that the hydrogen storage tank used for storing the liquid hydrogen source material and the liquid hydrogen storage carrier is provided with a space for storing the liquid hydrogen source material and a space for storing the liquid hydrogen storage carrier, namely the first storage room 108 and the second storage room 109, and the two storage rooms are separated through the movable partition board 112. The first storage room and the second storage room are each provided with an input port and an output port, the pump 102 is arranged at the output port of the first storage room, the liquid hydrogen source material is input into the pipeline of the heat dissipation device 117 arranged outside the hydrogen internal combustion engine through the operation of the pump, the heater 118 arranged outside the reaction still is connected with the heat dissipation device through a pipeline, and the liquid hydrogen source material cools the hydrogen internal combustion engine and heats the reaction still through heat exchange and finally enters the reaction still 104 through the input pipe.

The reaction still is a tubular type reaction still and filled with the dehydrogenation catalyst. The liquid hydrogen source material is catalyzed and decomposed in the reaction still, the reaction products are input into the gas-liquid separator 113 to be separated into hydrogen and the liquid hydrogen storage carrier, and the liquid hydrogen storage carrier is conveyed back to the second storage room, for storing the liquid hydrogen storage carrier, of the hydrogen storage tank. Hydrogen is conveyed to the buffer tank 105 through the gas-liquid separator and then enters the hydrogen internal combustion engine 110, hydrogen and oxygen in the oxygen storage tank 116 are input into the hydrogen internal combustion engine through the pump at the same time according to the mass ratio of 1:8, and conversion from chemical energy to mechanical energy is conducted on hydrogen and oxygen in the hydrogen internal combustion engine, so as to drive transportation facilities like automobiles and ships to run.

By applying the dehydrogenation system to a compact car, the hydrogen storage tank with the volume of 60-100 L can provide 4.5-5.8 kg of hydrogen, which allows the compact car to travel 500 km.

By applying the dehydrogenation system to a truck, the hydrogen storage tank with the volume of 150-250 L can provide 11.3-14.5 kg of hydrogen, which allows the truck to travel 500 km.

Eighth Embodiment

Figure 7:
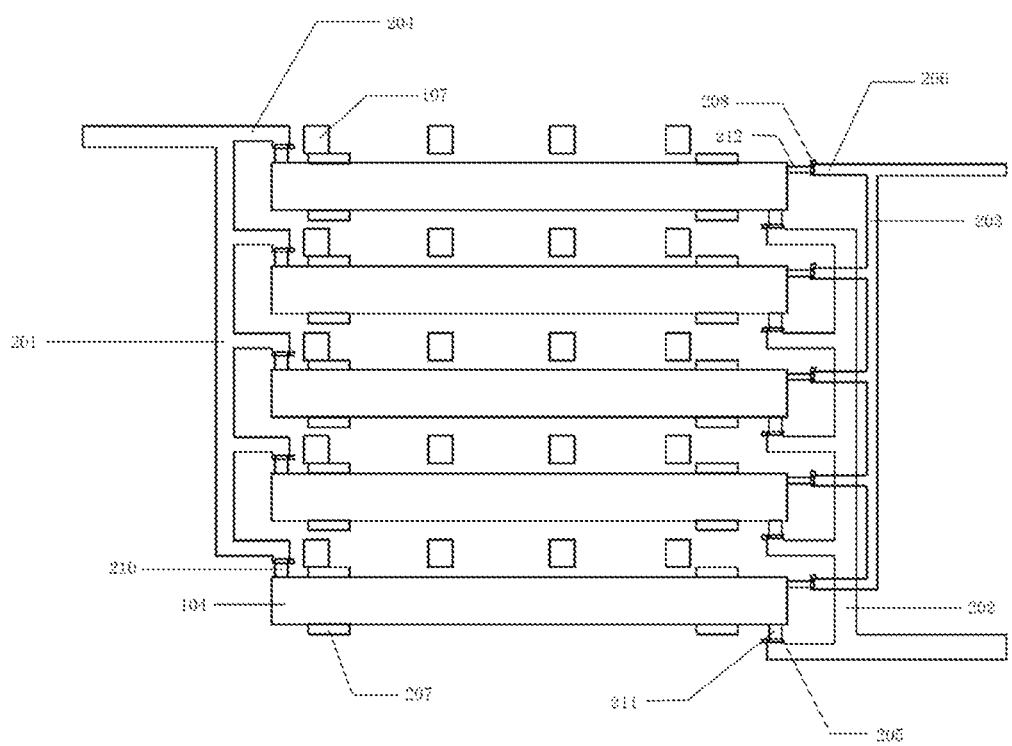
FIG. 7 is a structure diagram of reaction stills, a support and heating devices in an eighth embodiment of the present invention.

FIG. 7 is a structure diagram of the reaction stills, the support and the heating devices. The support is of a multi-layer structure and provided with a main liquid inlet pipe 201, a main liquid outlet pipe 202 and a main gas outlet pipe 203, and each layer is provided with a branch liquid inlet pipe 204, a branch liquid outlet pipe 205, a branch gas outlet pipe 206 and reaction still bayonets 207. The connection valves 208 are arranged at ports of each branch liquid inlet pipe, each branch liquid outlet pipe and each branch gas outlet pipe.

The reaction stills 104 are thin-layer tubular type reaction stills, and the number of the reaction stills is five and can be increased or reduced as needed. Each reaction still is filled with the dehydrogenation catalyst and an inert material. Each reaction still is provided with a liquid inlet 210, a liquid outlet 211 and a gas outlet 212, and each reaction still can be inserted into the heating devices in the support and connected with the corresponding branch liquid inlet pipe, the corresponding branch liquid outlet pipe and the corresponding branch gas outlet pipe through the liquid inlet, the liquid outlet and the gas outlet respectively.

The heating devices are electric heating devices 107, the number of the heating devices on each layer is four, the heating devices are arranged outside the reaction stills at equal intervals, and the heating devices heat the reaction still in a segmented mode.

The liquid hydrogen source material enters the branch liquid inlet pipes through the main liquid inlet pipe and then enters the reaction stills, and is decomposed into hydrogen and the liquid hydrogen storage carrier by the reaction stills at 120-250° C. under the action of the dehydrogenation catalyst, hydrogen enters the main gas outlet pipe through the branch gas outlet pipes and then is sent into the gas storage tank, and the liquid hydrogen storage carrier enters the main liquid outlet pipe through the branch liquid outlet pipes and is sent then back to the liquid storage tank.

Ninth Embodiment

Figure 8:
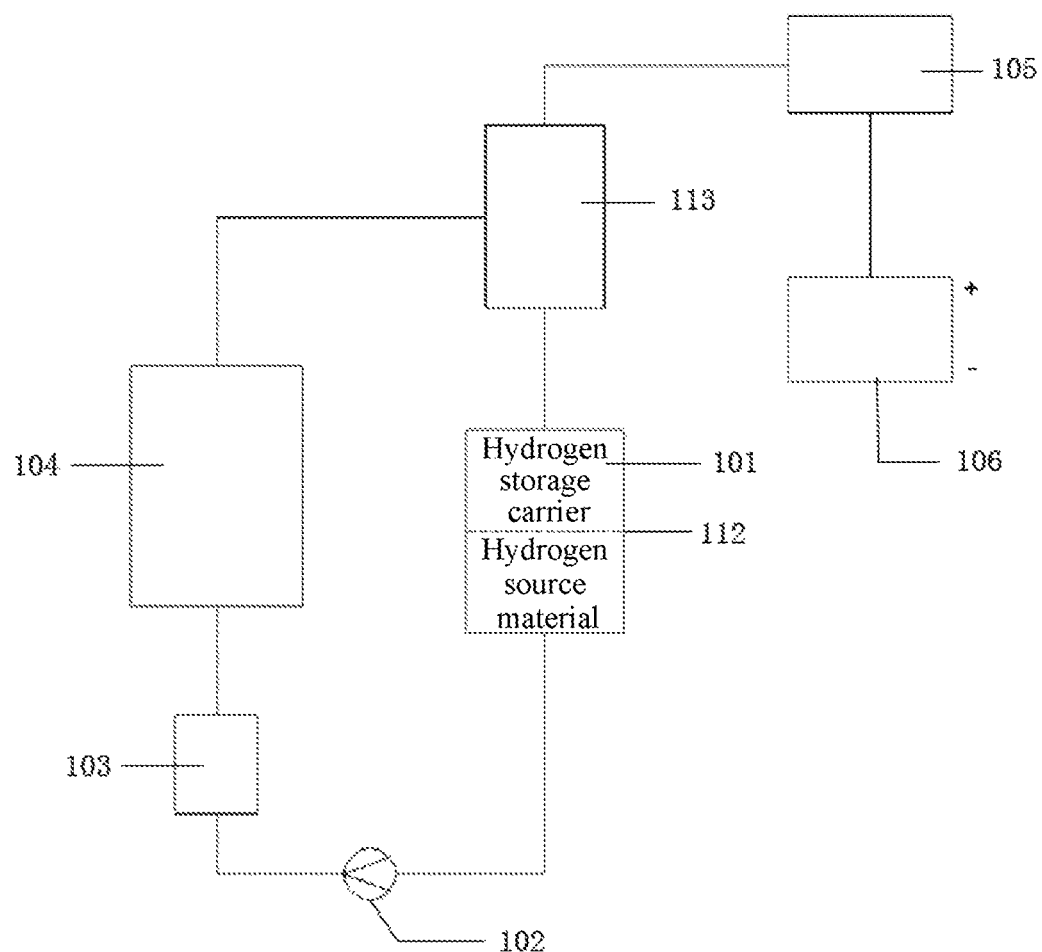
FIG. 8 is a structure diagram of a dehydrogenation reaction system according to a ninth embodiment of the present invention.

As show in FIG. 8, the dehydrogenation reaction system comprises the storage device 101, the preheater 103, the pump 102, the reaction still 104, the gas-liquid separator 113 and the hydrogen fuel cell 106. The storage device is used for storing the liquid hydrogen source material and the liquid hydrogen storage carrier and is provided with the space for storing the liquid hydrogen source material and the space for storing the liquid hydrogen storage carrier, and the two spaces are separated through the movable partition board 112. The preheater is connected to a liquid delivery port in the end, storing the liquid hydrogen source material, of the storage device through a pipeline, the pump is arranged on the pipeline, the preheater is connected with the reaction still, the reaction still is connected with the gas-liquid separator, the gas outlet of the gas-liquid separator is connected with the hydrogen fuel cell, and the liquid outlet is connected with a liquid inlet, storing the liquid hydrogen storage carrier, of the storage device.

The liquid hydrogen source material stored in the storage device is conveyed to the preheater through the pump to be heated to 150° C., and then enters the reaction still to generate hydrogen and the liquid hydrogen storage carrier at the temperature of 170° C. and the airspeed of 1 under the action of the catalyst, after the reaction products are separated in the gas-liquid separator, the liquid hydrogen storage carrier is conveyed back to the storage device, hydrogen enters the buffer tank 105 with the pressure about 1-6 bar, then hydrogen is depressurized to 0.3-0.7 bar and introduced into the hydrogen fuel cell to be converted into electric energy, 25% of the generated electric energy is consumed by the pump, the preheater, the reaction still and other system equipment, and the rest is output; when the system is closed, the reaction still has a certain temperature left and continues to react for a while, and hydrogen generated during this period is stored in the buffer tank to be used in the next time of starting.

Tenth Embodiment

Figure 9:
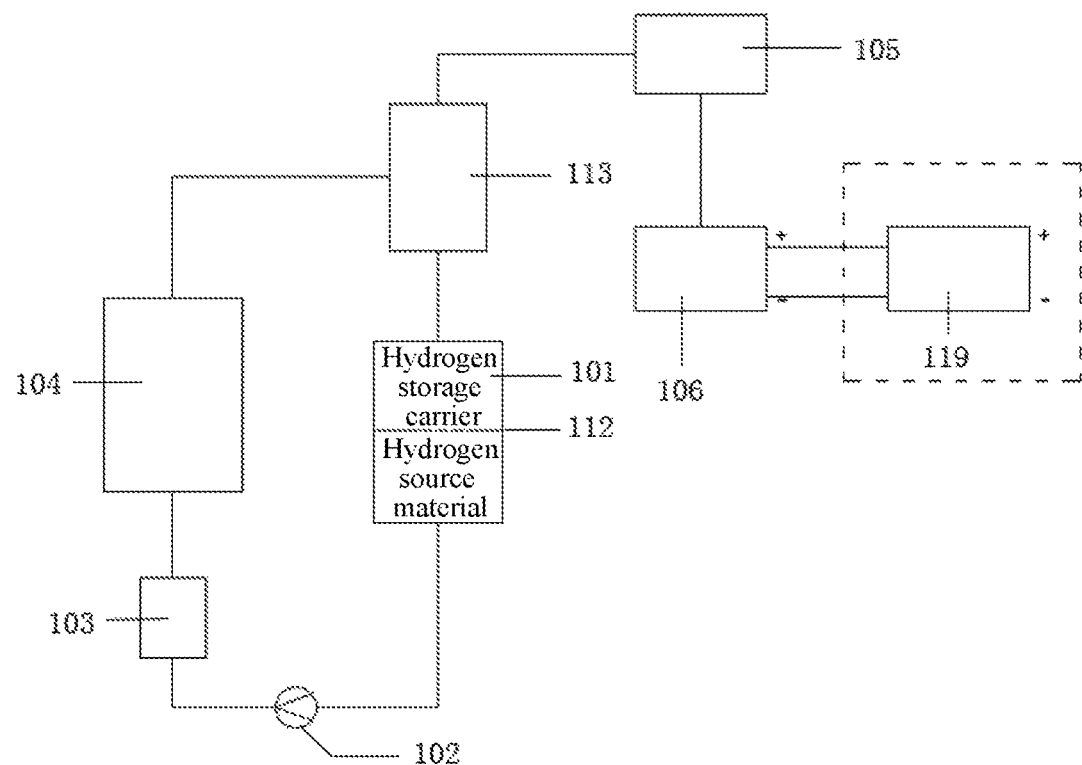
FIG. 9 is a structure diagram of a dehydrogenation reaction system according to a tenth embodiment of the present invention.

As show in FIG. 9, the dehydrogenation reaction system comprises the storage device 101, the preheater 103, the pump 102, the reaction still 104, the gas-liquid separator 113, the hydrogen fuel cell 106 and the storage battery 119. The storage device is used for storing the liquid hydrogen source material and the liquid hydrogen storage carrier and is provided with the space for storing the liquid hydrogen source material and the space for storing the liquid hydrogen storage carrier, and the two spaces are connected through the movable partition board. The preheater is connected to a liquid delivery port in the end, storing the liquid hydrogen source material, of the storage device through a pipeline, the pump is arranged on the pipeline, the preheater is connected with the reaction still, the reaction still is connected with the gas-liquid separator, the gas outlet of the gas-liquid separator is connected with the hydrogen fuel cell, and the liquid outlet is connected with a liquid inlet, storing the liquid hydrogen storage carrier, of the storage device. The hydrogen fuel cell is connected with the storage battery.

The liquid hydrogen source material stored in the storage device is conveyed to the preheater through the pump to be heated to 160° C., and then enters the reaction still to generate hydrogen and the liquid hydrogen storage carrier at the temperature of 190° C. and the airspeed of 2 under the action of the catalyst, after reaction products are separated in the gas-liquid separator, the liquid hydrogen storage carrier is conveyed back to the storage device, hydrogen enters the buffer tank 105 with the pressure about 1-6 bar, then hydrogen is depressurized to 0.3-0.7 bar and introduced into the hydrogen fuel cell to be converted into electric energy, part of the generated electric energy is stored in the storage battery, 20% of the electric energy of the storage battery is consumed by the pump, the preheater, the reaction still and other system equipment, and the rest is output; when the system is closed, the reaction still has a certain temperature left and continues to react for a while, and hydrogen generated during this period generates electric energy through the hydrogen fuel cell and is stored in the storage battery to be used in the next time of starting.

Eleventh Embodiment

Figure 10:
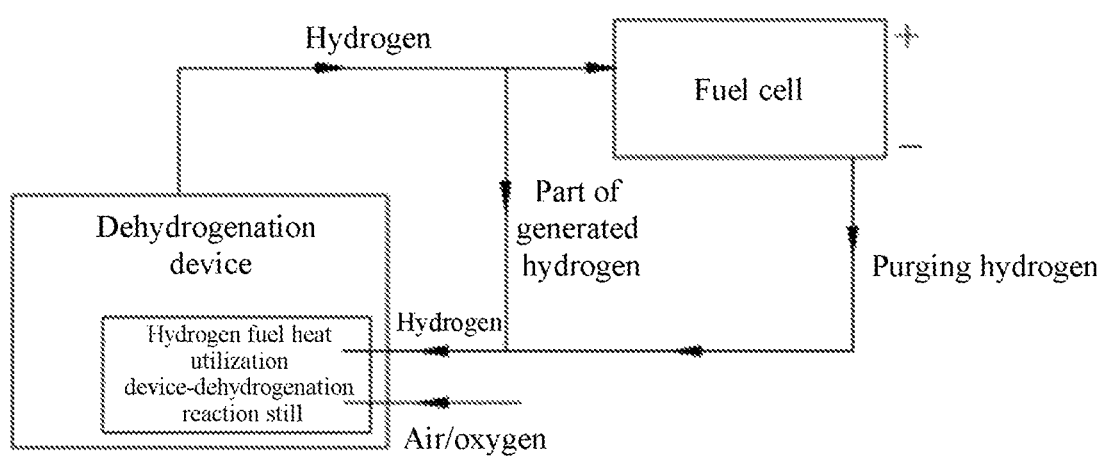
FIG. 10 is a structure diagram of a dehydrogenation reaction system according to an eleventh embodiment of the present invention.
Figure 11:
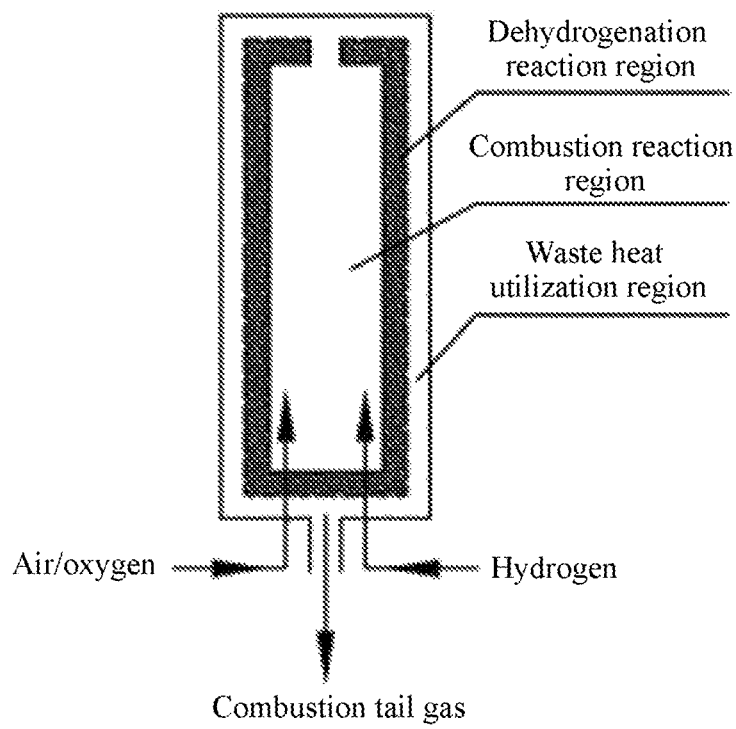
FIG. 11 is a schematic diagram of a reaction still and hydrogen fuel heat utilization device integrated unit in the eleventh embodiment of the present invention.

FIG. 10 is a structure diagram of the dehydrogenation reaction system, FIG. 11 is a structure diagram of equipment formed by directly integrating the hydrogen fuel heat utilization device with the reaction still, a combustion reaction region, a dehydrogenation reaction region and a waste heat utilization region are arranged from the inner layer to the outer layer, the combustion reaction region is the hydrogen fuel heat utilization device, and the dehydrogenation reaction region is the dehydrogenation reaction still.

Hydrogen and air burn in the combustion reaction region and heat is supplied to the inner side of the dehydrogenation reaction region, and generated tail gas supplies heat to the outer side of the dehydrogenation reaction region through the waste heat utilization region; and the hydrogen source material reacts to generate the liquid hydrogen storage carrier and hydrogen in the dehydrogenation reaction region at a certain temperature under the action of the catalyst, part of generated hydrogen is conveyed to the hydrogen fuel cell through a pipeline to be converted into electric energy, the rest of generated hydrogen is sent to the hydrogen fuel heat utilization device to burn together with purging tail gas of the hydrogen fuel cell so as to generate heat, and heat is transmitted to the dehydrogenation reaction still. The utilization rate of combustion heat is higher than 65%, and usage of fuel cell stacks is reduced by 10% or more.

Twelfth Embodiment

Figure 12:
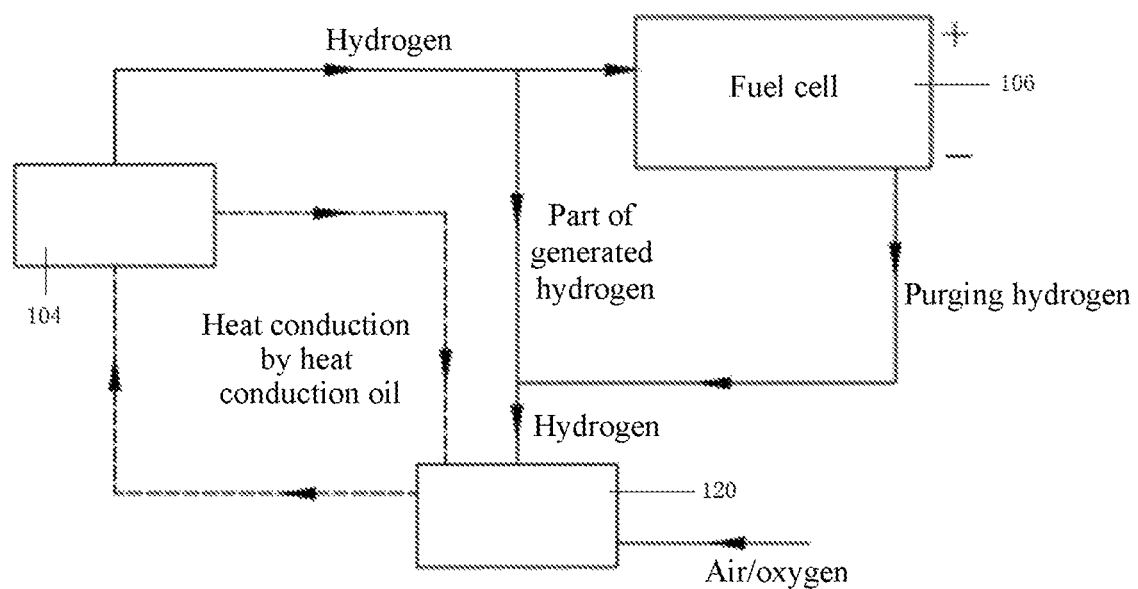
FIG. 12 is a structure diagram of a dehydrogenation reaction system according to a twelfth embodiment.

FIG. 12 is a structure diagram of the dehydrogenation reaction system, heat energy generated by the hydrogen fuel heat utilization device 120 is supplied to the reaction still 104 through the heat conduction device (heat conduction by conduction oil), the liquid hydrogen source material reacts in the dehydrogenation reaction still to generate the liquid hydrogen storage carrier and hydrogen at a certain temperature under the action of the catalyst, part of generated hydrogen is conveyed to the hydrogen fuel cell 106 through a pipeline to be converted into electric energy, the rest of generated hydrogen is sent to the hydrogen fuel heat utilization device to burn together with purging tail gas of the hydrogen fuel cell so as to generate heat, and heat is supplied to the dehydrogenation reaction still through the heat conduction device (medium being conduction oil). The utilization rate of combustion heat is higher than 60%, and usage of fuel cell stacks is reduced by 10% or more.

Thirteenth Embodiment

Figure 13:
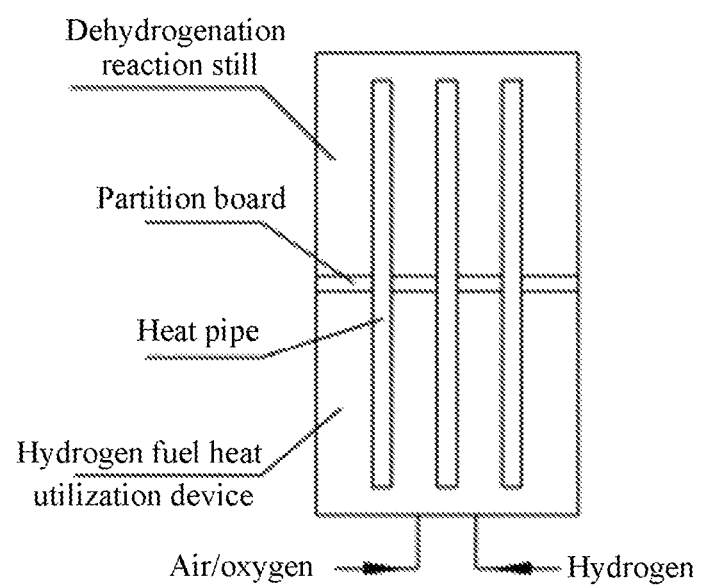
FIG. 13 is a structure diagram of a dehydrogenation heat utilization device in a thirteenth embodiment.

FIG. 13 is a structure diagram of the dehydrogenation heat utilization device. A partition board is arranged between the hydrogen fuel heat utilization device and the dehydrogenation reaction still, and heat energy generated by the hydrogen fuel heat utilization device is supplied to the dehydrogenation reaction still through heat conduction of a heat pipe. The liquid hydrogen source material reacts in the dehydrogenation reaction still to generate the liquid hydrogen storage carrier and hydrogen at a certain temperature under the action of the catalyst, part of generated hydrogen is conveyed to the hydrogen fuel cell through a pipeline to be converted into electric energy, the rest of generated hydrogen is sent to the hydrogen fuel heat utilization device to burn together with purging tail gas of the hydrogen fuel cell so as to generate heat, and heat is supplied to the dehydrogenation reaction still through the heat conduction device (heat conduction of the heat pipe). The utilization rate of combustion heat is higher than 55%, and usage of fuel cell stacks is reduced by 10% or more.

Fourteenth Embodiment

Figure 14:
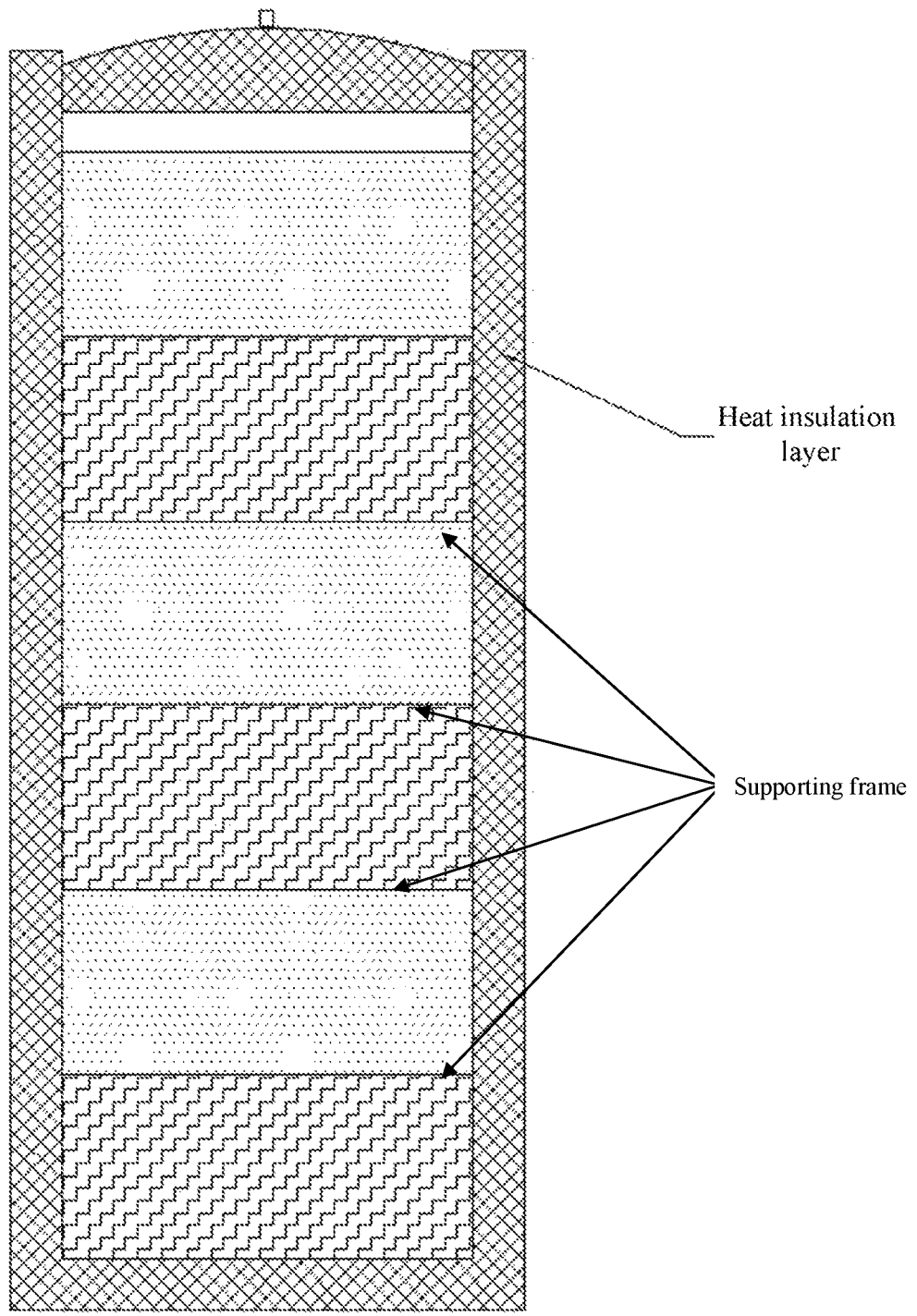
FIG. 14 is a schematic diagram of a tower type reaction still in a fourteenth embodiment.

FIG. 14 is a schematic diagram of the tower type reaction still, the reaction still adopts a modular design, the reaction still comprises a heat insulation layer and threere action units, the reaction units are wrapped in the heat insulation layer, an inlet is formed in the lower portion, and an outlet is formed in the upper portion. The heat insulation layer comprises an inner heat insulation layer and an outer heat insulation layer, the outer surface of the inner heat insulation layer is sequentially wrapped in two layers of heat insulation materials and two layers of reflective tinfoil at intervals, and the portion between the inner heat insulation layer and the outer heat insulation layer is vacuumized to form a vacuum layer and filled with rock wool. A supporting frame is arranged in the reaction still, and the reaction units are fixed to the supporting frame. Each reaction unit comprises a reaction section and a heating section, wherein the reaction layer is filled with the catalyst, and the electric heating device is arranged in the heating layer. Due to the fact that generated gas carries lots of heat, heat exchange can be conducted on inlet liquid.

The reaction units are sequentially connected and are isolated through nets.

The reaction still is provided with a temperature controller to be used for controlling the temperature of each heating device.

The dehydrogenation rate can be reduced when the dehydrogenation temperature of the liquid hydrogen source material is too low, and side reaction can occur easily when temperature is too high. The temperatures of the three reaction units are controlled to be 180° C., 190° C. and 200° C., the liquid hydrogen source material is dodecahydrocarbazole, the dehydrogenation product is carbazole, the dehydrogenation rate reaches 95% or more, and side reaction is avoided.

Although preferred embodiments have been described, the embodiments and drawings are not intended to be limiting, and numerous other variations and modifications can be devised by those skilled in the art, but will also fall within the spirit and scope of the invention. Therefore, the scope of protection of the invention is determined by the protection scope of claims of the application.

What is claimed is:

1. A dehydrogenation reaction system for a liquid hydrogen source material, comprising:
   a storage device for storing a liquid hydrogen source material and a liquid hydrogen storage carrier;
   a reaction still for dehydrogenation of the liquid hydrogen source material;
   a gas-liquid separator for separating product hydrogen generated from dehydrogenation of the liquid hydrogen source material from the liquid hydrogen storage carrier;
   a buffer tank for storing hydrogen; and
   a heater for heating the reaction still,
   wherein the liquid hydrogen storage carrier comprises at least two compounds chosen from unsaturated aromatic hydrocarbons or unsaturated heterocyclic compounds, wherein a number of aromatic rings in the aromatic hydrocarbon is 1-20, a number of heterocyclic rings in the unsaturated heterocyclic compound is 1-20 and a total number of heteroatoms in the unsaturated heterocyclic compound is 1-20, wherein heteroatoms in the heterocyclic unsaturated compounds are one or more of N, S, O, and P; and at least one of the two compounds has a melting point lower than 80° C., wherein the storage device contains a first storage space for storing the liquid hydrogen source material and a second storage space for storing the liquid hydrogen storage carrier and wherein the liquid hydrogen source material is fed into the reaction still-through an input pipe, the dehydrogenation reaction of the liquid hydrogen source material is conducted in the reaction still, and the product hydrogen is transferred to the buffer tank, and the liquid hydrogen storage carrier generated after dehydrogenation is transferred back to the storage device, wherein the reaction still is a thin-layer plate type reaction still or a thin-layer tubular type reaction still, and the reaction still is supported by a support, wherein the support comprises a plurality of layers, a main liquid inlet pipe, a main liquid outlet pipe, and a main gas outlet pipe, and each of the plurality of layers is provided with a branch liquid inlet pipe, a branch liquid outlet pipe, a branch gas outlet pipe, a heater, and a reaction still bayonet; the reaction still has a liquid inlet, a liquid outlet, and a gas outlet, wherein, when the reaction still is inserted into the reaction still bayonets of the support, a reaction still inlet, a reaction still outlet and a hydrogen outlet are in fluid communication with the main liquid inlet pipe, the main liquid outlet pipe, and the main gas outlet pipe of the support, respectively.

2. The dehydrogenation reaction system for the liquid hydrogen source material according to claim 1, wherein the heater of the reaction still is a waste heat exchanger, an electric heater, an electromagnetic heater, a chemical reaction heat supply device, or a microwave heater, wherein a pre heater is arranged on the input pipe to the reaction still for preheating the liquid hydrogen source material from the storage device before entering the reaction still for the dehydrogenation reaction.

3. The dehydrogenation reaction system for the liquid hydrogen source material according to claim 1, wherein each branch liquid inlet pipe, each branch liquid outlet pipe, and each branch gas outlet pipe is fluidly connected to the liquid inlet, the liquid outlet, and the gas outlet of the reaction still, respectively.

4. The dehydrogenation reaction system for the liquid hydrogen source material according to claim 1, wherein the reaction still comprises a heat insulation layer and one or more reaction units, and the reaction units are wrapped in the heat insulation layer, each reaction unit comprises a reaction section and a heating section, wherein the reaction section is filled with a catalyst, and a heater is arranged in the heating section; the reaction units are sequentially connected, wherein the liquid hydrogen source material enters through an inlet of the reaction still and passes through each of the reaction units in sequence for dehydrogenation reaction, and reaction products are discharged through an outlet of the reaction still.

5. The dehydrogenation reaction system for the liquid hydrogen source material according to claim 1, further comprising a first pressure sensor for detecting a pressure of the reaction still;

a second pressure sensor for detecting a pressure of the buffer tank;

a liquidometer for detecting a position of the liquid level in the gas-liquid separator;

a pressure stabilizing valve and a second valve arranged between the buffer tank and a hydrogen utilization device; and a controller for acquiring signals of the first pressure sensor, the second pressure sensor, and the liquidometer and sending control signals when a preset condition is met, wherein the control signals are for controlling a flow of the raw material and the reaction products in the reaction device and start and stop of dehydrogenation reaction.

6. The dehydrogenation reaction system for the liquid hydrogen source material according to claim 1, wherein the buffer tank is connected with a hydrogen fuel cell.

7. The dehydrogenation reaction system for the liquid hydrogen source material according to claim 6, wherein a heat conduction device is arranged between the reaction still and the heater, wherein the heat conduction device is connected with a pipeline heat transfer device arranged outside the hydrogen fuel cell through a pipeline, and the heat conduction medium in the heat conduction device and the pipeline heat transfer device is the liquid hydrogen source material.

8. The dehydrogenation reaction system for the liquid hydrogen source material according to claim 7, wherein the storage device is connected with the pipeline heat transfer device, the heat conduction device is connected with the reaction still through the input pipe, and the liquid hydrogen source material enters the pipeline heat transfer device arranged outside the hydrogen fuel cell firstly, and then enters the reaction still for dehydrogenation reaction, wherein the dehydrogenation reaction is heated by heat generated by the hydrogen fuel cell transferred to the reaction still through the heat conduction device.

9. The dehydrogenation reaction system for the liquid hydrogen source material according to claim 8, wherein the heater used for heating the reaction still is an electric heater, an electromagnetic heater, or a microwave heater.

10. The dehydrogenation reaction system for the liquid hydrogen source material according to claim 6, further comprising a battery for storing electric energy generated by the hydrogen fuel cell.

11. The dehydrogenation reaction system for the liquid hydrogen source material according to claim 6, wherein the heater is a hydrogen fuel heat utilization device connected with the reaction still, and part of hydrogen generated by the reaction still and purging tail gas of the hydrogen fuel cell are converted into heat energy in the hydrogen fuel heat utilization device and transferred to the reaction still.

12. The dehydrogenation reaction system for the liquid hydrogen source material according to claim 11, wherein the hydrogen fuel heat utilization device transmits heat energy generated from hydrogen combustion to the dehydrogenation reaction still through a heat conduction medium by means of a heat exchange pipe arranged outside or inside the reaction still, and the heat conduction medium is the liquid hydrogen source material, a heat conduction oil, or a metal salt bath.

13. The dehydrogenation reaction system for the liquid hydrogen source material according to claim 1, wherein the buffer tank is connected with a hydrogen internal combustion engine, and hydrogen and oxygen are simultaneously conveyed into the hydrogen internal combustion engine.

14. The dehydrogenation reaction system for the liquid hydrogen source material according to claim 13, further comprising an oxygen storage tank for storing oxygen.

15. The dehydrogenation reaction system for the liquid hydrogen source material according to claim 14, further comprising a heat dissipation device disposed outside the hydrogen internal combustion engine, and is connected with the heater outside the reaction still through a pipeline to transmit heat through a heat conduction medium flowing in the heat dissipation device and the heater.

16. The dehydrogenation reaction system for the liquid hydrogen source material according to claim 15, wherein the storage device is connected with the heat dissipation device, the heater is connected with the reaction still through the input pipe, and the heat conduction medium is the liquid hydrogen source material.

\* \* \* \* \*